Patented July 20, 1926.

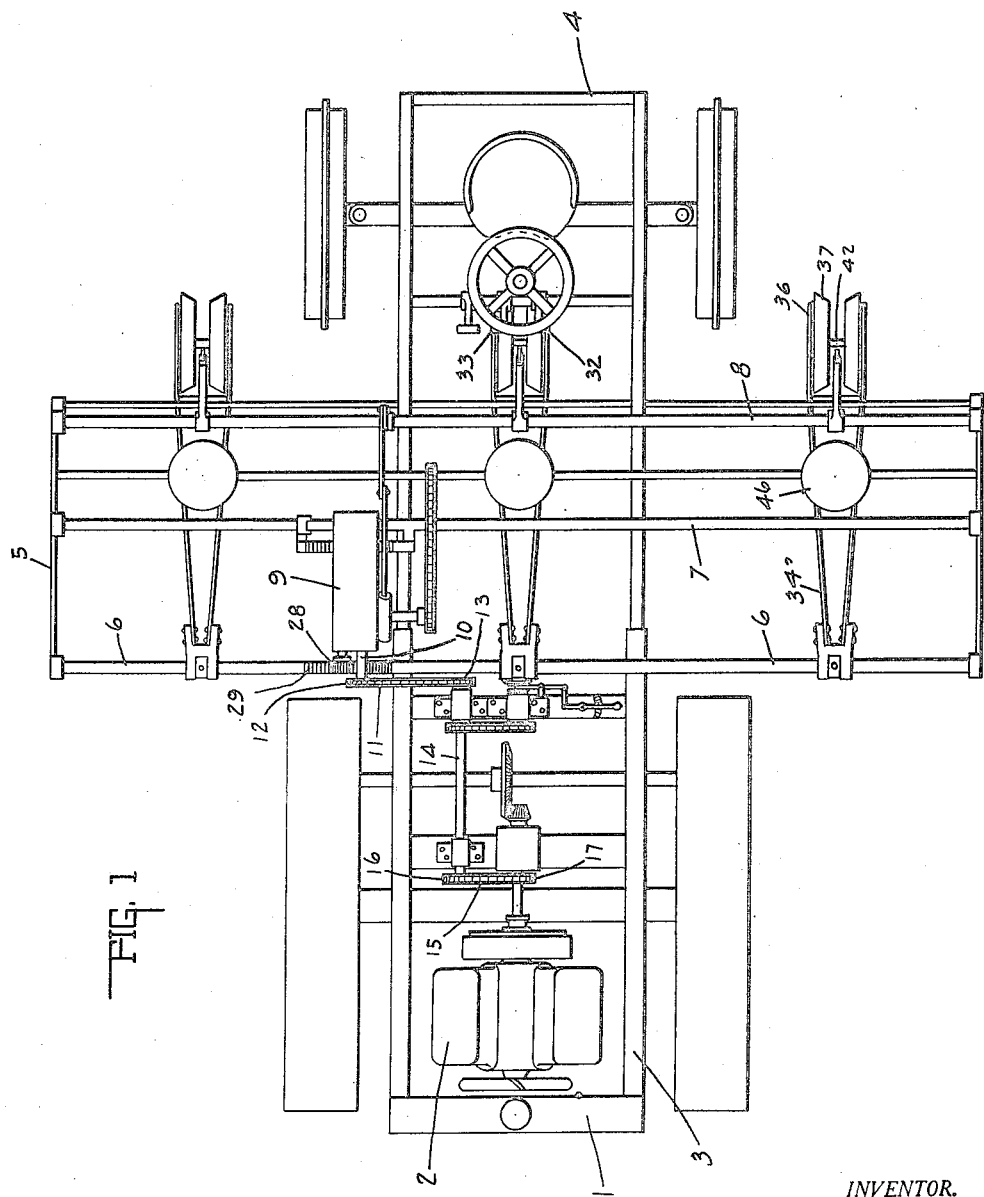

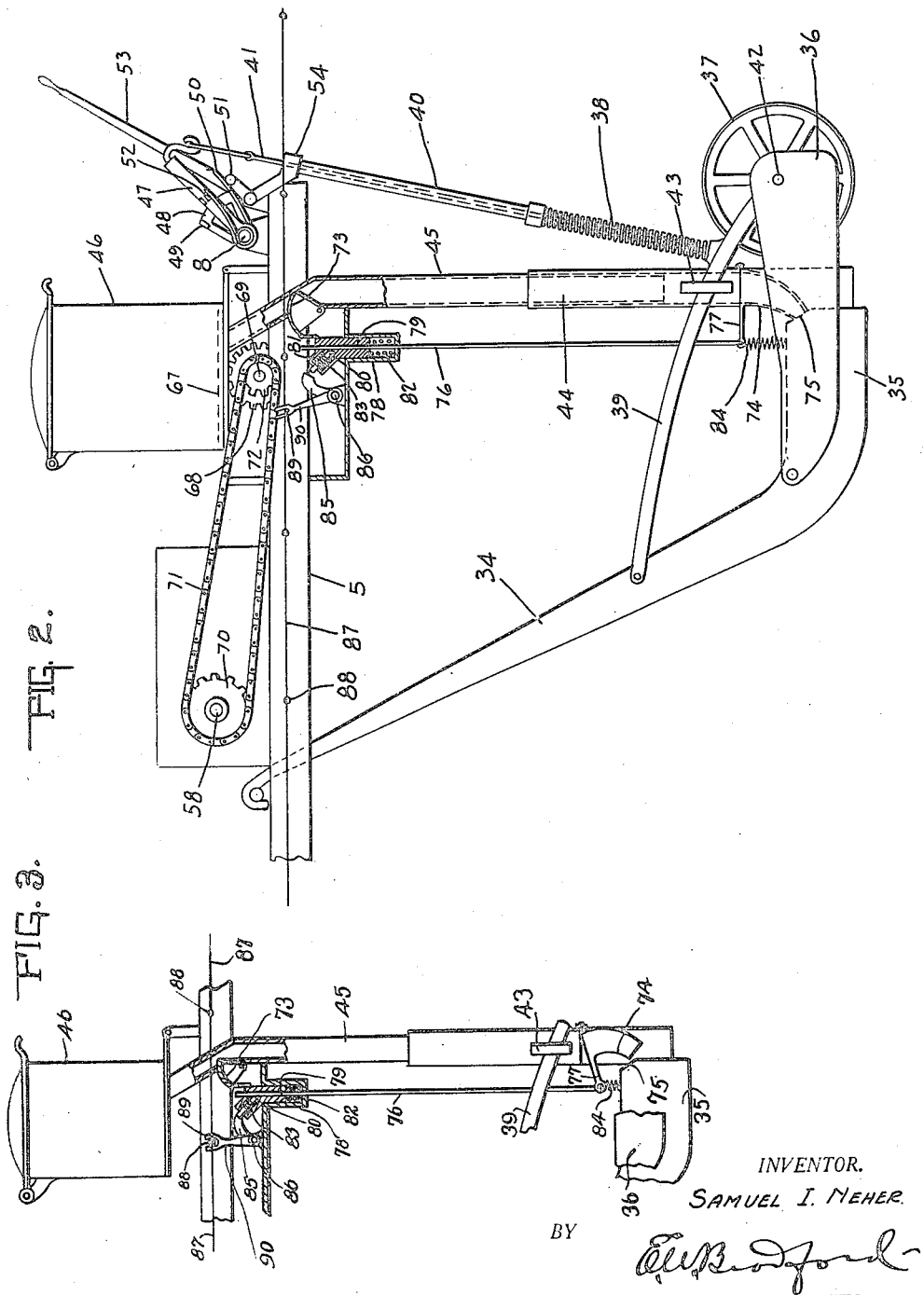

1,593,504

UNITED STATES PATENT OFFICE.

SAMUEL I. NEHER, OF KEYSTONE, INDIANA.

PLANTER.

Application filed September 26, 1921. Serial No. 503,186.

This invention relates to planter attachments for tractors and is a companion case to my application, Serial No. 488,426 filed July 29, 1921. The prime feature of the invention is the provision of means for attaching a planter construction to a tractor and having means associated therewith for automatically regulating the space between the rows made by the planter.

A further feature of the invention is the provision of means for automatically elevating the various planter attachments simultaneously.

A further feature of the invention is the provision of means for readily determining the depth at which the planter attachments will enter the soil.

A further feature of the invention is the provision of means for controlling the passage of the grain from the grain hoppers to the furrow made by parts of the planter attachment.

A further feature of the invention is the provision of means for utilizing the motor of the tractor for operating the various parts of the planter mechanism.

Other objects and advantages will be hereinafter more fully set forth and pointed out in the accompanying specification.

In the accompanying drawings, which are made a part of this application,

Figure 1 is a top plan view of a combined tractor and planter,

Figure 2 is an enlarged side elevation partly in section of one of the planting elements.

Figure 3 is a view of the discharge mechanism showing the parts in the opposite position from that of Figure 2.

Referring to the drawings in which similar reference numerals designate corresponding parts throughout the several views, 1 indicates the tractor on which is mounted a motor 2 for propelling the tractor, the frame 3 having an adjustable section 4 for increasing or decreasing the length of the tractor frame.

Mounted upon the frame 3 and extending transversely thereof is a planter frame 5 upon which are mounted shafts 6, 7, and 8, which are longitudinally adjustable in either direction. Mounted in any suitable manner upon the frame 5 is a housing 9 through one end of which projects a shaft 10 which is driven from the motor 2 through the medium of a sprocket chain 11 passing around sprockets 12 and 13 on the shafts 10 and 14 respectively, and through a sprocket chain 15 passing around sprockets 16 and 17 respectively, on the shaft 14 and the driving shaft of the motor.

That part of the shaft 10 entering the housing 9 is provided with a universal joint 18 so that the outer end of the shaft 10 may be raised or lowered for moving a gear 19 into engagement with shoulders 20 and 21, located respectively, on the upper and lower bars 22 and 23 of a loop 24, said loop forming a part of the shaft 7. The shaft 7 is also provided with an offset rack portion 25 with which co-operates a gear 26 mounted upon a shaft 27, said shaft also extending through the end wall of the housing 9 parallel with and forwardly of the shaft 10 and has a pinion 28 which meshes with gear teeth 29 formed on the shaft 6, gears 19 and 26 and the pinion 28 being employed for moving the shafts 6, 7, and 8 lengthwise, the shafts being moved lengthwise in one direction when the gear 19 is elevated into engagement with the shoulders 20 and in the opposite direction when the gear 19 is lowered into engagement with the shoulders 21, this movement resulting by reversing the trend of the shoulder 20 from that of the shoulders 21. The shaft 10 is raised and lowered for engaging the gear 19 with the shoulders on the loop 24 through the medium of a toggle 30, said toggle being operated through the medium of a series of levers 31 which are in turn operated from pedals 32 and 33, one of which is employed for operating the levers to raise the shaft 10 and the other for lowering the shaft 10. The parts thus far described are substantially identical with the structure shown and described in the aforementioned prior application and it is not deemed necessary to enter further into a detail description of their operations in this application.

Attached to the shaft 6 are a plurality of beams 34 which terminate at their lower ends in furrow making shoes or runners 35, such as are commonly used with seed planters, and pivotally attached to each shoe is a shield 36 to the rear of which is attached a regulating wheel 37, said wheel being so constructed that it will serve to fill the furrow made by the shoe after the grain has been deposited therein, as well as regulating the depth to which the shoe will enter the soil. The regulating wheel 37 is normally retained in lowered position by means of a compression spring 38, one end of which rests against a yoke 39 and the opposite end against the lower end of a tubular sleeve 40, a rod 41 being introduced through the sleeve and compression spring and having its lower end attached to the yoke 39. The forward end of the yoke 39 is pivoted to the beam 34 while the opposite end thereof is pivoted to the axle 42 upon which the regulating wheel 37 is mounted, the arms of the yoke being extended through guides 43 on opposite sides of a chute 44, the upper end of the chute telescopically engaging a down spout 45 which guides the grain when discharged from the grain hopper 46, the chute 44 conveying the grain after it is discharged from the down spout into the furrow made by the runner 35.

The upper end of the rod 41 is attached to a supporting bar 47, which bar is in turn attached to the shaft 8 and associated with each supporting bar is a guide frame 48 which is substantially in segmental formation and having shoulders 49 at its extremities which serve to limit movement of the bar 47 independently of the guide frame 48. The supporting bars 47 and guide frames 48 are yieldingly suspended so as to yieldingly support the regulating wheels and runners to which they are attached by means of springs 50, which are preferably arranged on opposite sides of the supporting bars 47, parts of each spring being coiled around the shaft 8, while one end of each spring rests against a tensioning bar 51 and the opposite ends engage with projections 52 on the faces of the supporting bars 47. The tension of the springs 50 may be regulated by the tensioning bar 51 through the medium of a lever 53 and also by adjusting the ends of the springs 50 on projections 52. An arm 54 is attached to the tensioning bar 51, which arm carries the sleeve 40, and consequently increases or decreases the tension of the compression spring 38 when the tensioning bar is adjusted through the medium of the lever 53. The supporting bars and parts associated therewith are the same as shown and described in my former application above referred to, and said supporting bars are operated to raise the runners and parts associated therewith by attaching a lever 55 to the shaft 8, the upper end of which is connected with an operating bar 56 by means of a link 57, the operating bar 56 being moved lengthwise in one direction by a gear 59, which gear is mounted upon a shaft 58 extending at right angles to the shaft 10, the shafts 10 and 58 having intermeshing bevel gears 59 and 60, respectively, for driving the shaft 58 and gear 59. The forward end of the operating bar 56 passes through a casing 61 mounted upon one face of the housing 9, the under face of the bar 56 having shoulders 62 which engage the teeth of the gear 59 and cause the operating bar to move endwise when the shoulders are moved into engagement with the gear. The bar 56 is normally held out of engagement with the gear 59 by means of a spring 63, and the bar is lowered into engagement with the gear by means of a lever 64 and when the operating bar 56 has been operated to elevate the runners 35 and parts associated therewith, a latch 65 drops into engagement with a notch 66 in the upper face of the bar 56 and holds the runners in elevated position until the latch is manually released. The hopper 46 is provided with the usual or any preferred form of dropping plate 67, there being a dropping plate in each hopper. These plates are rotated from gears 68 mounted upon a shaft 69 and this shaft is driven from the shaft 58 by mounting on the extending end thereof a sprocket gear 70 around which extends a sprocket chain 71, said chain also extending around a sprocket 72 on the shaft 69, and as the dropping plates rotate the grain is deposited successively into the upper end of the down spout 45. In order to cause the grain to be bunched and dropped in close proximity to the rear end of the runner 35, a valve 73 is pivotally mounted on down spout 45 and so arranged that when in closed position, passage through the down spout will be closed, consequently the descent of the grain will be interrupted at this point. The lower portion of the chute 44 is also provided with a nozzle 74, the upper end of which is pivoted to the chute while the lower restricted end thereof co-operates with a flat face 75 at the rear end of the runner 35, and when the nozzle is in closed position the grain entering the nozzle will rest against the face 75 until such time as the nozzle is operated to move the discharge end thereof from the flat face 75, and as the discharge end of the nozzle is in close proximity to the bottom of the furrow the grain will be deposited in a bunch and will not be scattered along the furrow.

Any suitable means may be provided for operating the valve 73 and the nozzle 74, but in the present instance a rod 76 is attached to an arm 77 projecting outwardly from the hinged end of the nozzle 74, the upper end of the rod passing through a housing 78 in which is located a plunger 79, the valve 73 being attached to the upper end of the plunger. The rod 76 is slidably mounted in the plunger and in order to cause the rod to descend when the plunger is lowered, a pin 80 is introduced through an extension 81 on the plunger 79, the inner end of which is adapted to grip the rod 76 when pressure is applied to the outer end of the pin. When the dog 85 is forced against the pin 80, said pin grips the rod preventing relative movement between the rod and the plunger and they are both forced downward by the dog thus opening the valve 73 and unseating the nozzle 74. The plunger 79 is normally held in elevated position by means of a coil spring 82 located within the housing 78 while the pin 80 is normally held in outward or elevated position by means of a spring 83 located in the extension 81, and the nozzle 74 is normally held in its closed position by means of a spring 84, one end of which engages the arm 77 and the opposite end rests upon the runner 35, consequently when the pressure on the pin 80 is released the springs 82 and 83 will return the plunger 79 and pin 80 to their initial positions and the spring 84 will return the nozzle 75 to its initial or closed position, the upward movement of the plunger 79 also moving the valve 73 to closed position.

Any suitable means may be provided for operating the pin 80, but in the present instance a dog 85 is fixed to a shaft 86 and the shaft is rotated from a wire 87 having spaced knobs 88 thereon, which successively engage the bifurcated end 89 of a lever 90, said lever being also attached to the shaft 86. In this manner the dog 85 is intermittently operated for depressing the pin 80 and the parts associated therewith, consequently the valve 73 and nozzle 74 will be intermittently moved to open position for discharging grain into the furrow. The rod 76 extends loosely through the plunger 79 and is slightly flexible which construction allows the lower end of the rod attached to the arm 77 to swing in an arc about its pivot and the pivot for the nozzle 74. This construction further permits the rod to slide freely through the plunger when the pin 83 is not depressed into engagement therewith and the telescoping chute members 44 and 45 are thus permitted free relative movement. In operating this form of device when it is desired to change the position of the runners and other planter parts, the gear 19 is raised or lowered depending upon which direction the planter parts are to be shifted, and when the gear moves into engagement with the teeth 20 or 21 the shafts to which the planter parts are attached will be moved lengthwise. When it is desired to raise the runners out of engagement with the soil the lever 64 is operated and the bar 56 depressed until the shoulders 62 engage with the teeth on the gear 57, and as said gear is constantly rotating the shaft 8 will be rotated and the bar 47 operated to raise the runners 35, and said runners will remain in elevated position until such time as the lever 64 is reversely operated for raising the latch 65 out of engagement with the notch 66, whereupon the runners will be free to descend and engage the soil, the depth to which the runners will enter the soil being determined by the springs 38 and 50.

As shown in the drawings, three rows of grain may be planted at the same time, and owing to the fact that the grain is released simultaneously from the various hoppers the rows of grain will be in line in either direction and will be spaced a uniform distance apart.

Having thus fully described my said invention, what I claim as new and desire to secure by Letters Patent, is:

1. In a planter construction, a grain hopper, a down spout connected with the hopper, a valve for regulating the passage of grain through the down spout, a plunger for operating said valve, a furrow making runner, a hingedly mounted nozzle having its free end in engagement with parts of the runner for regulating the discharge of the grain into the furrow, a rod for operating said nozzle, the upper end of said rod extending through said plunger, and a longitudinally movable pin carried by said plunger and adapted to be moved into engagement with said rod for locking the plunger and rod, and means for moving said pin to grip said rod and to depress said plunger for lowering the nozzle and opening the valve, substantially as set forth.

2. In combination with a tractor frame having a planter frame mounted thereon, a grain hopper, a down spout connected with said hopper, a furrow making runner, a valve for regulating the passage of grain through the upper end of said down spout, a plunger for operating said valve, a hingedly mounted nozzle having its free end normally in contact with said runner for regulating the discharge of grain into the furrow, a rod having its upper end extending through said plunger for operating said nozzle to discharge the grain, and means for locking said rod and plunger whereby the nozzle and valve may be simultaneously operated, substantially as set forth.

3. A planter comprising a hopper, a down spout formed of a pair of telescoping sections, a valve in each section of the down spout, a plunger, a rod extending through the plunger said plunger and rod being operatively connected with said valves respectively, means for simultaneously operating said plunger and said rod irrespective of the relative position of the sections of the downspout, substantially as set forth.

4. In combination with a tractor frame having a planter frame mounted thereon, a grain hopper, an extensible down spout connected with said hopper, a furrow making runner, a valve for regulating the passage of grain through the upper end of said down spout, a plunger for operating said valve, a hingedly mounted nozzle having its free end normally in contact with said runner for regulating the discharge of grain into the furrow, a rod having its upper end extending through said plunger for operating said nozzle to discharge the grain, and means for locking said rod and plunger whereby the nozzle and valve may be simultaneously operated irrespective of the relative distance apart of the valve and nozzle, substantially as set forth.

In witness whereof, I have hereunto set my hand and seal at Keystone, Indiana, this 16th day of September, A. D. nineteen hundred and twenty-one.

SAMUEL I. NEHER. [L. S.]